United States Patent [19]

Pelligrino

[11] 4,338,832
[45] Jul. 13, 1982

[54] SYSTEM FOR SHIFTABLE MULTI-SPEED HYDRAULICALLY OPERATED POWER TRANSMISSION AND ELECTRONIC CONTROLLER THEREIN

[75] Inventor: Paul A. Pelligrino, Rockford, Ill.

[73] Assignee: Twin Disc, Incorporated, Racine, Wis.

[21] Appl. No.: 120,253

[22] Filed: Feb. 11, 1980

[51] Int. Cl.³ .................... B60K 41/10; B60K 41/06
[52] U.S. Cl. .................................. 74/866; 74/867
[58] Field of Search ............... 74/866, 867, 868, 869, 74/752 A; 137/625.15

[56] References Cited

U.S. PATENT DOCUMENTS

| | | | |
|---|---|---|---|
| 2,088,427 | 7/1937 | Maurer | 74/752 A |
| 2,360,695 | 10/1944 | Linden et al. | 137/625.46 |
| 3,151,718 | 10/1964 | Temple | 137/625.11 |
| 3,732,753 | 5/1973 | Olsen et al. | 74/752 A X |
| 3,805,640 | 4/1974 | Schneider et al. | 74/645 |
| 3,937,105 | 2/1976 | Arai et al. | 74/866 X |
| 4,015,488 | 4/1977 | Akeson et al. | 74/866 |
| 4,094,211 | 6/1978 | Espenschied | 74/868 |
| 4,155,277 | 5/1979 | Minami et al. | 74/867 X |
| 4,246,990 | 1/1981 | Strantz | 74/867 X |

FOREIGN PATENT DOCUMENTS

| | | | |
|---|---|---|---|
| 206294 | 11/1959 | Austria | 74/868 |
| 307624 | 6/1978 | U.S.S.R. | 74/867 |

Primary Examiner—Leslie Braun
Attorney, Agent, or Firm—James E. Nilles

[57] ABSTRACT

An off-highway heavy duty dump truck includes an engine, a torque converter, a shiftable multi-speed hydraulically operated power transmission for driving the truck wheels, and a control system for the transmission. The transmission includes internal clutches which are selectively operated by a solenoid-operated rotary speed range selector valve to effect shifting in neutral, reverse or several forward speed ranges. The control system includes a manually operable multi-position speed range selector switch, sensing devices for ascertaining transmission input and output speeds, a limit switch and rotary switch responsive to the condition and rotary position, respectively, of the rotary range selector valve, and other condition responsive switches. The control system further includes an electronic controller having logic circuits therein for receiving input signal information from the aforesaid switches and sensing devices and for providing output signals to operate the rotary range selector valve and effect automatic shifting of the transmission to a selected speed range, provided predetermined conditions are met. The electronic controller provides operational safeguards until such conditions are met, responds appropriately to system failures, and displays of relevant system information.

13 Claims, 8 Drawing Figures

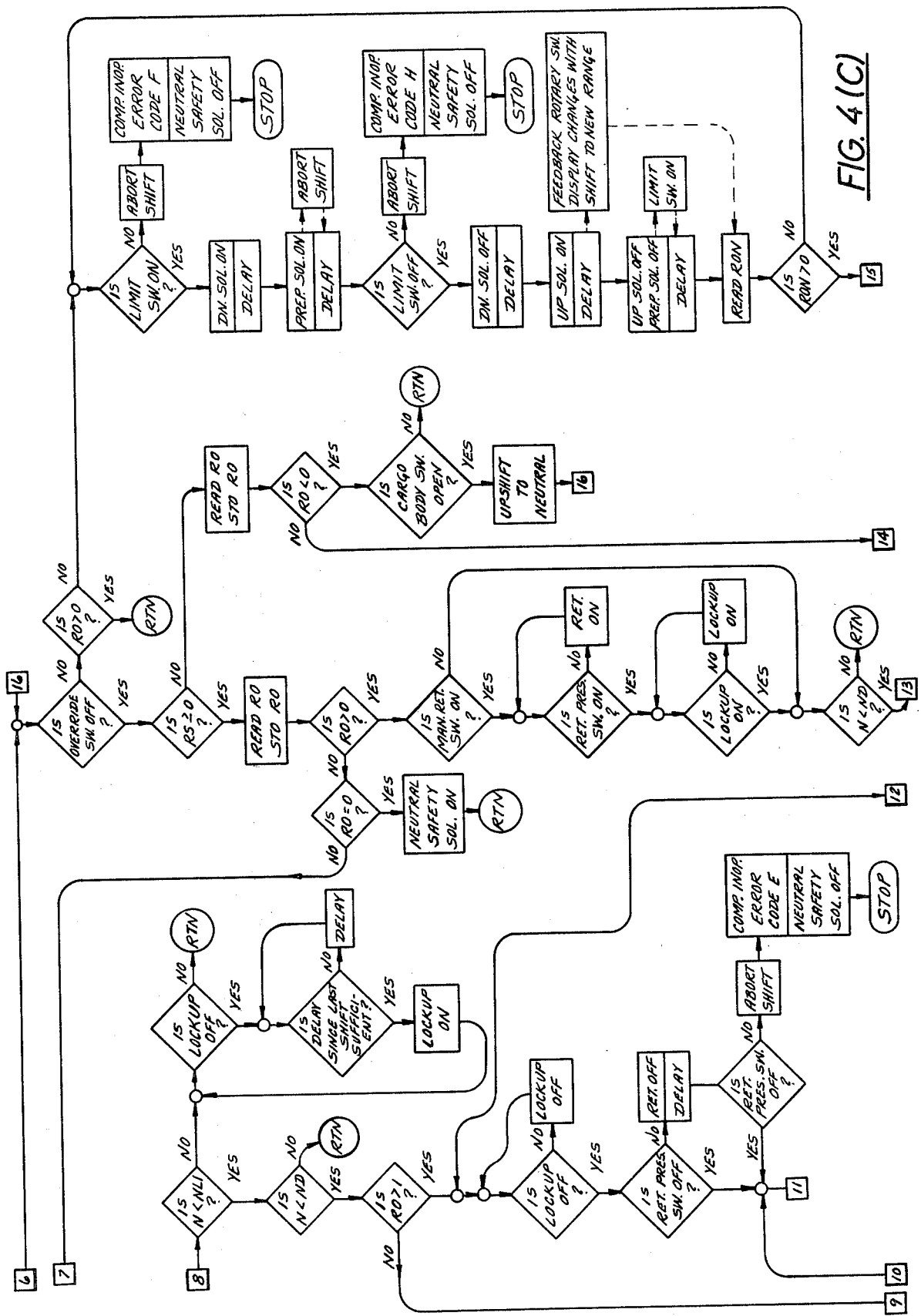

SYSTEM FOR SHIFTABLE MULTI-SPEED HYDRAULICALLY OPERATED POWER TRANSMISSION AND ELECTRONIC CONTROLLER THEREIN

BACKGROUND OF THE INVENTION

1. Field of Use

This invention relates generally to control systems for multi-speed shiftable power transmissions such as are used in off-highway trucks. In particular, it relates to an electronic logic controller for such systems which receives relevant signal information and provides control signals to effect automatic shifting, provided predetermined operating conditions are met.

2. Description of the Prior Art

U.S. Pat. Nos. 3,805,640 and 4,015,488, owned by the assignee of the present application, each disclose a control system for a multi-speed shiftable power transmission wherein a plurality of clutches in the transmission are hydraulically operated to effect shifting. Each clutch is operated by a separate individually actuatable solenoid valve, and these solenoid valves are actuated in proper sequence to effect shifting by an electronic controller which receives signal information from a speed range selector switch and other appropriate sources. These prior art systems are complex and costly because each requires a plurality of clutch solenoid valves, redundant hydraulic circuitry therefor, and redundant electrical circuitry in the electronic controller in order to effect proper sequential operation of the clutch solenoid valves. Furthermore, since each shift from one speed range to another requires sequential operation of several solenoid valves, the time to effect each shift is unduly prolonged.

U.S. patent application Ser. No. 73,508 filed Sept. 7, 1979 by Behlke, Black and Steinhagan, and owned by the assignee of the present application, discloses an improved multi-speed shiftable power transmission wherein the several hydraulically operated clutches for shifting the transmission to different speed ranges are operated by a novel solenoid-operated single rotary speed range selector valve. This rotary valve, which is movable to desired rotary positions by its solenoids, rapidly distributes pressurized hydraulic fluid to the appropriate clutch and eliminates the need for a separate individually actuatable solenoid valve for each transmission clutch. The rotary range selector valve and its drive means (including a geneva wheel and rack and pinion drive therefor which is actuated by upshift and downshift solenoid valves to rotate the range selector valve in step-by-step increments) insures that the transmission is shifted only one speed range at a time and insures that an engaged clutch for one speed range will be disengaged before another selected speed range clutch for another is engaged. Furthermore, blocker means are provided for preventing rotation of the geneva wheel and the range selector valve and thereby preventing engagement or disengagement of a clutch, unless the rack and pinion drive means for the geneva wheel is in a proper predetermined position. The arrangement offers many advantages, including reduced time between releasing one range clutch and engaging another, thereby enabling extremely fast shifts of the transmission.

SUMMARY OF THE PRESENT INVENTION

The present invention provides an improved control system and electronic controller for use therein for a power transmission of the type wherein a solenoid-operated rotary range selector valve is employed for shifting (i.e., effecting clutch operation) and is especially well-adapted for use with a transmission of the type disclosed in application Ser. No. 73,508, for example, or others using a movable range selector valve.

Broadly considered, the present invention contemplates a multi-speed shiftable power transmission having several hydraulically-operated shifting clutches therein which are selectively operable by means of a solenoid-operated valve (or otherwise moved) by means of upshift/downshift solenoid valves acting upon selector valve drive means and a prepositioning solenoid valve is also provided. The control system contemplates a selectively operable multi-position range selector switch (operable manually, for example); detector means such as magnetic pickups for sensing the speeds of the input and output shafts speed; a limit switch and a rotary switch for sensing the condition (readiness for operation) and the rotary position, respectively, of the range selector valve; and an electronic controller. The electronic controller receives electric signal information from the range selector switch, the detector means, the limit switch and the rotary switch; processes this information by means of logic circuitry therein; and provides appropriate output or control signals to the prepositioning solenoid valve and the upshift/downshift solenoid valves to thereby operate the rotary range selector valve to effect automatic shifting of the transmission to a selected speed range, provided predetermined conditions are met.

In a preferred embodiment of the invention disclosed herein, the power transmission is mounted on an off-highway heavy-duty load-handling dump truck type vehicle. The transmission input shaft is driven by a torque converter which in turn, is driven by an internal combustion engine, and the transmission output shaft is connected to drive the vehicle wheels. The torque converter includes a solenoid-operated lockup clutch and the transmission includes a solenoid-operated retarder clutch, both of which must be disengaged during shifting, which are operated in an appropriate manner and sequence by the electronic controller. The preferred embodiment including other auxilliary switches which provide relevant input signal information to the electronic controller, such as a throttle position switch actuated by the vehicle accelleration pedal, a retarder clutch pressure switch, a neutral start switch, also lockup pressure switch, a cargo (dump) body position switch, a cargo hoist valve air-pressure switch, a manually operable dump override switch, and so on. Furthermore, the electronic controller provides relevant information which is displayed on a display device on the vehicle operator's dashboard, such as vehicle speed, selected transmission range, condition of the lockup and retarder clutches, operational state of the electronic controller, and identification and location of specific system failures, if any.

A transmission control system and electronic controller therefor in accordance with the invention offers several advantages over the prior art. For example, it is especially well-adapted for use with rotary (or otherwise movable) range selector valves to effect relatively fast shifting. It processes a greater variety of input signal information than prior art systems and thereby increases the likelihood of correct system operation; reduces the possibilities of system malfunctions or component damage under adverse conditions; responds to a wide variety of possible system failures to effect either automatic protective action, such as system shut-down or fail-safe response, or provides adequate and timely warning to the operator so that appropriate action may be taken. These and other advantages will hereinafter appear.

THE DRAWINGS

Figure 1:
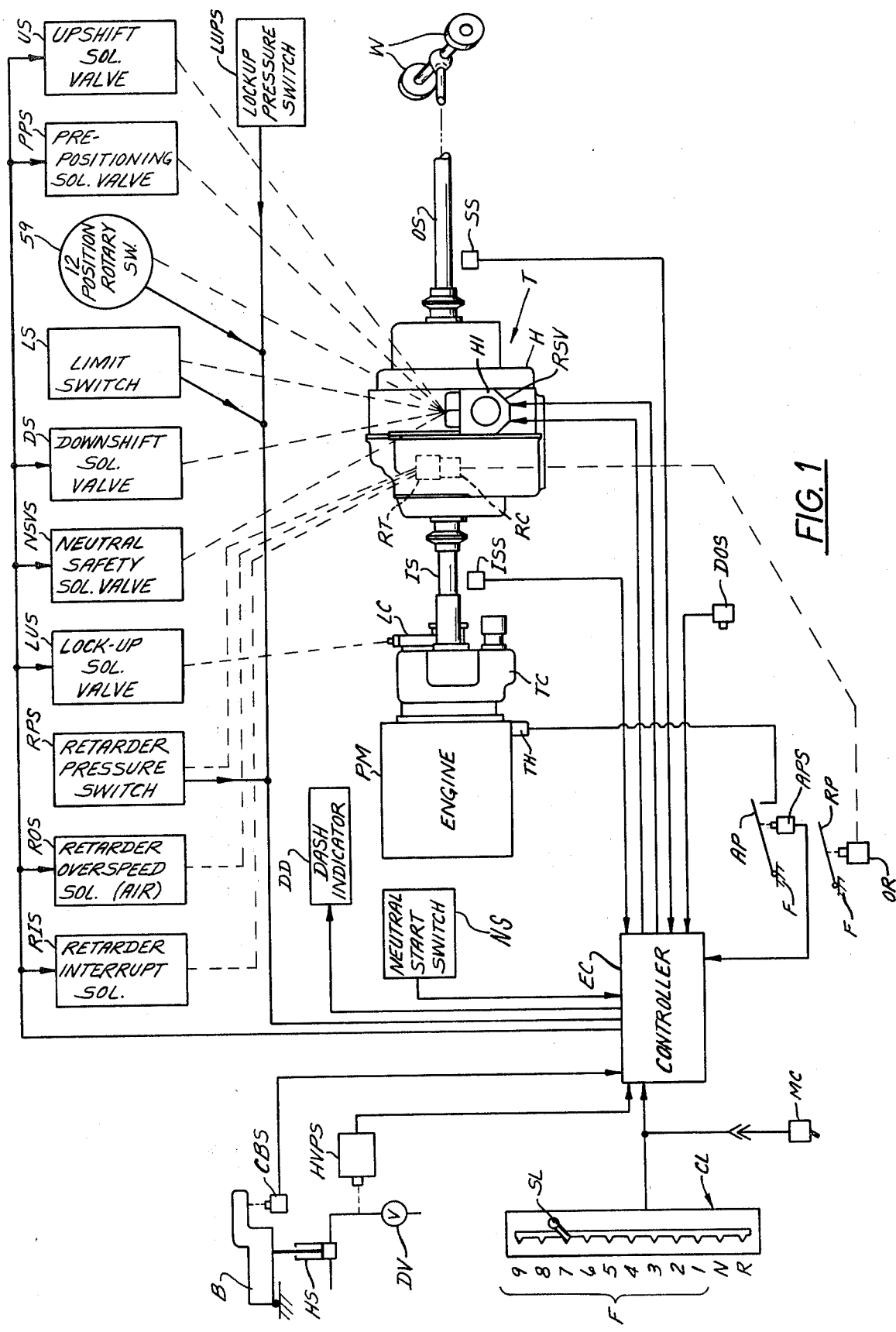
FIG. 1 is a schematic diagram of a transmission system and control system therefor, including an electronic controller, in accordance with the present invention.
Figure 3A:
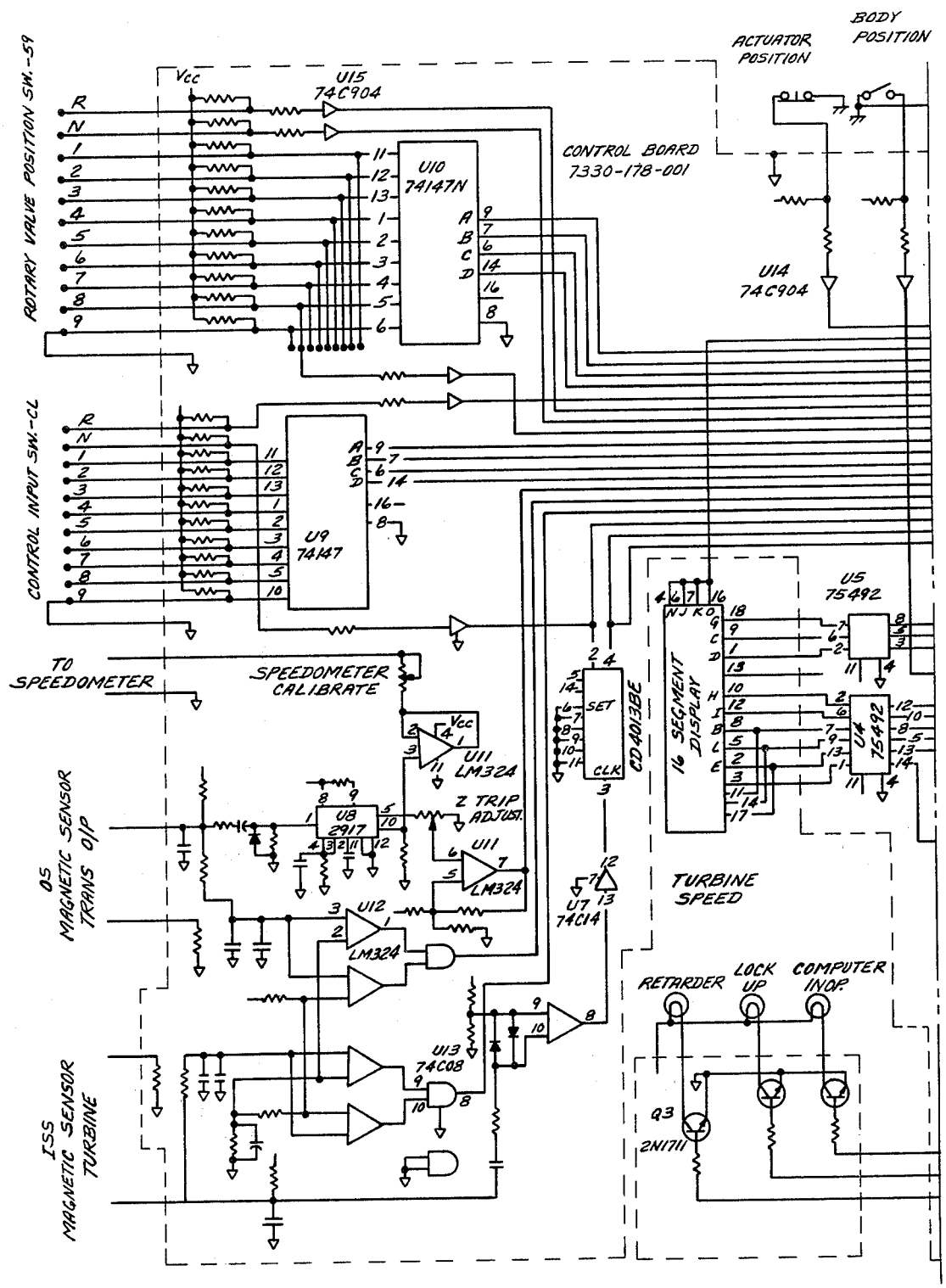
Figure 3B:
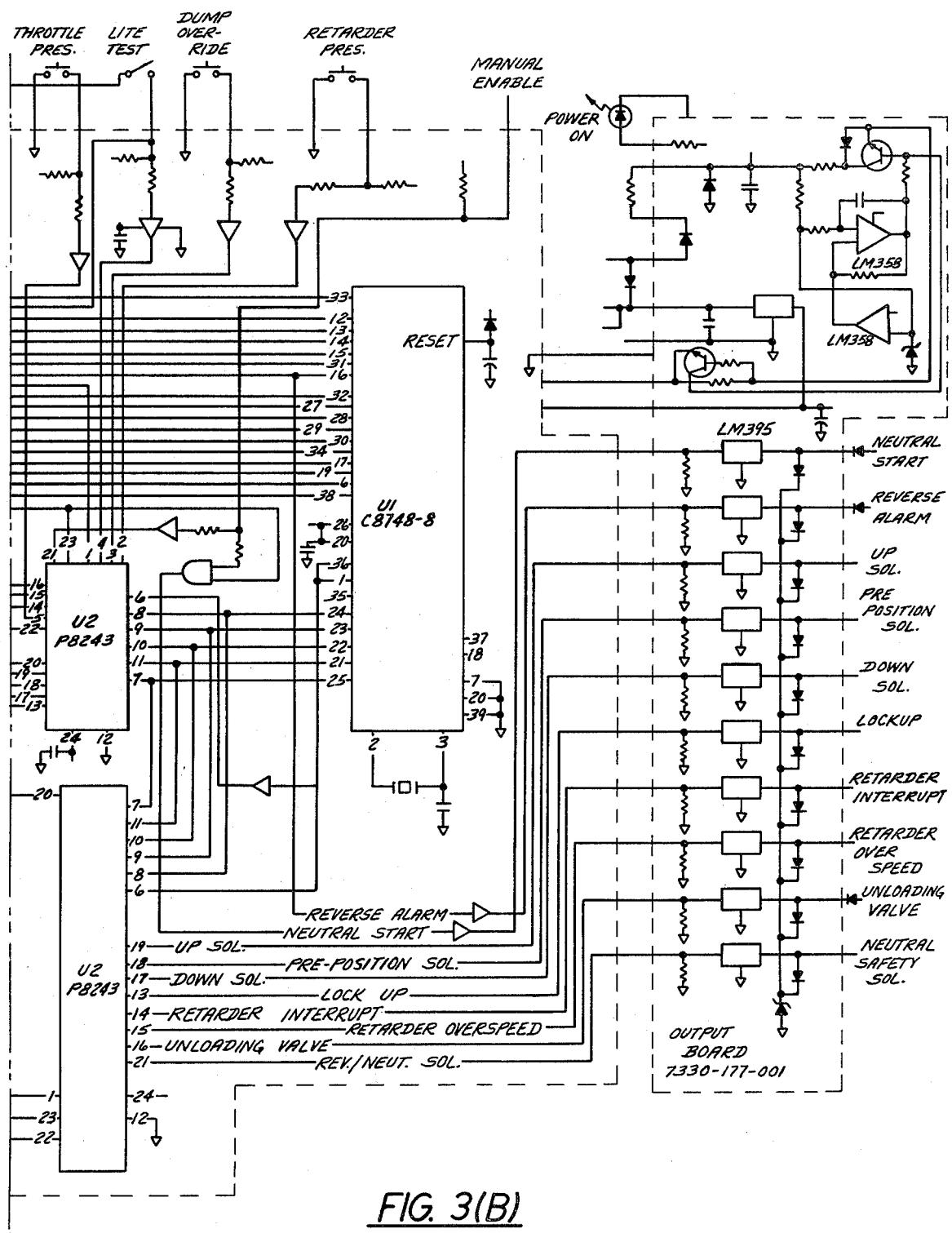
Figure 4A:
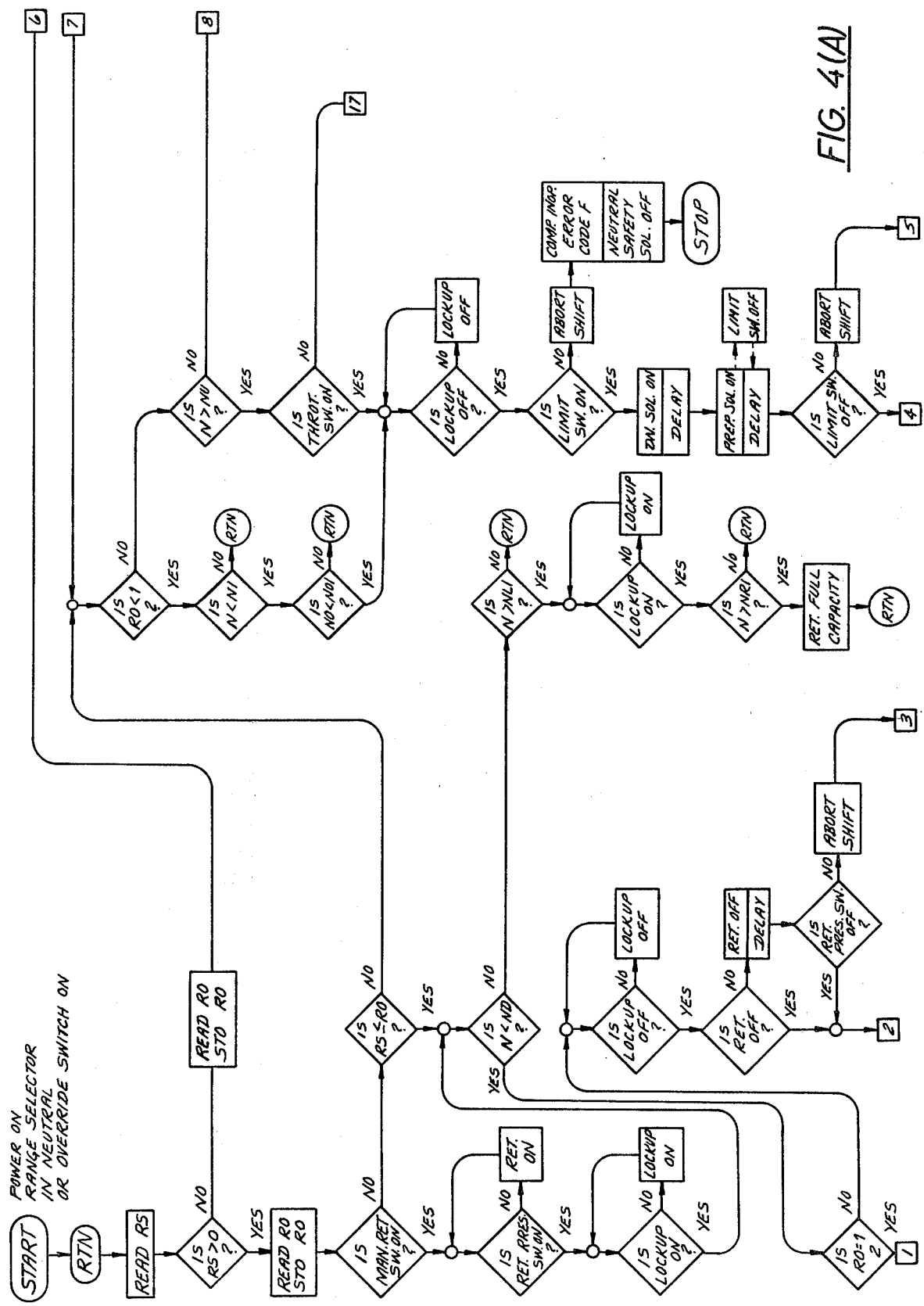
Figure 4B:
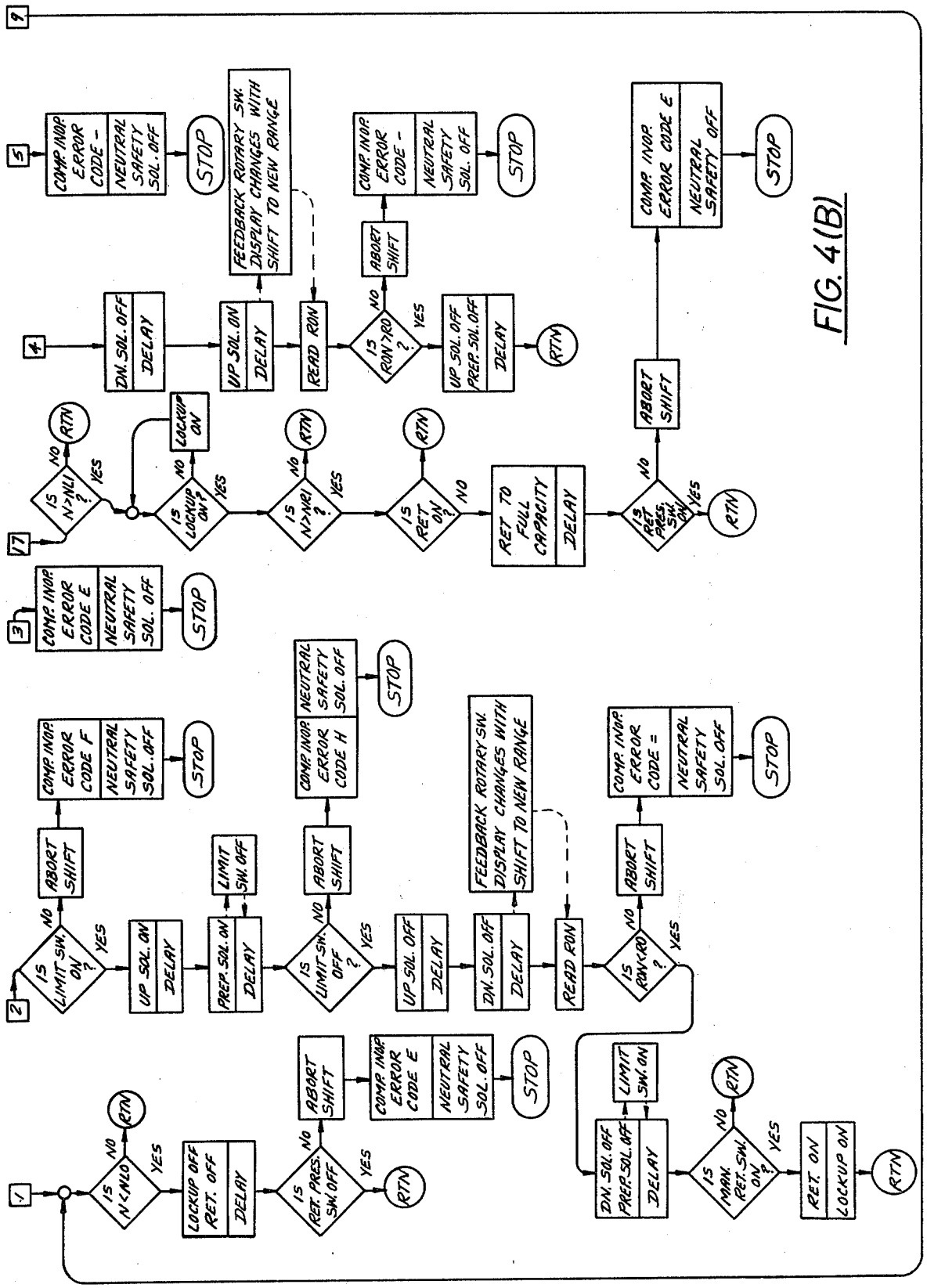
Figure 4D:
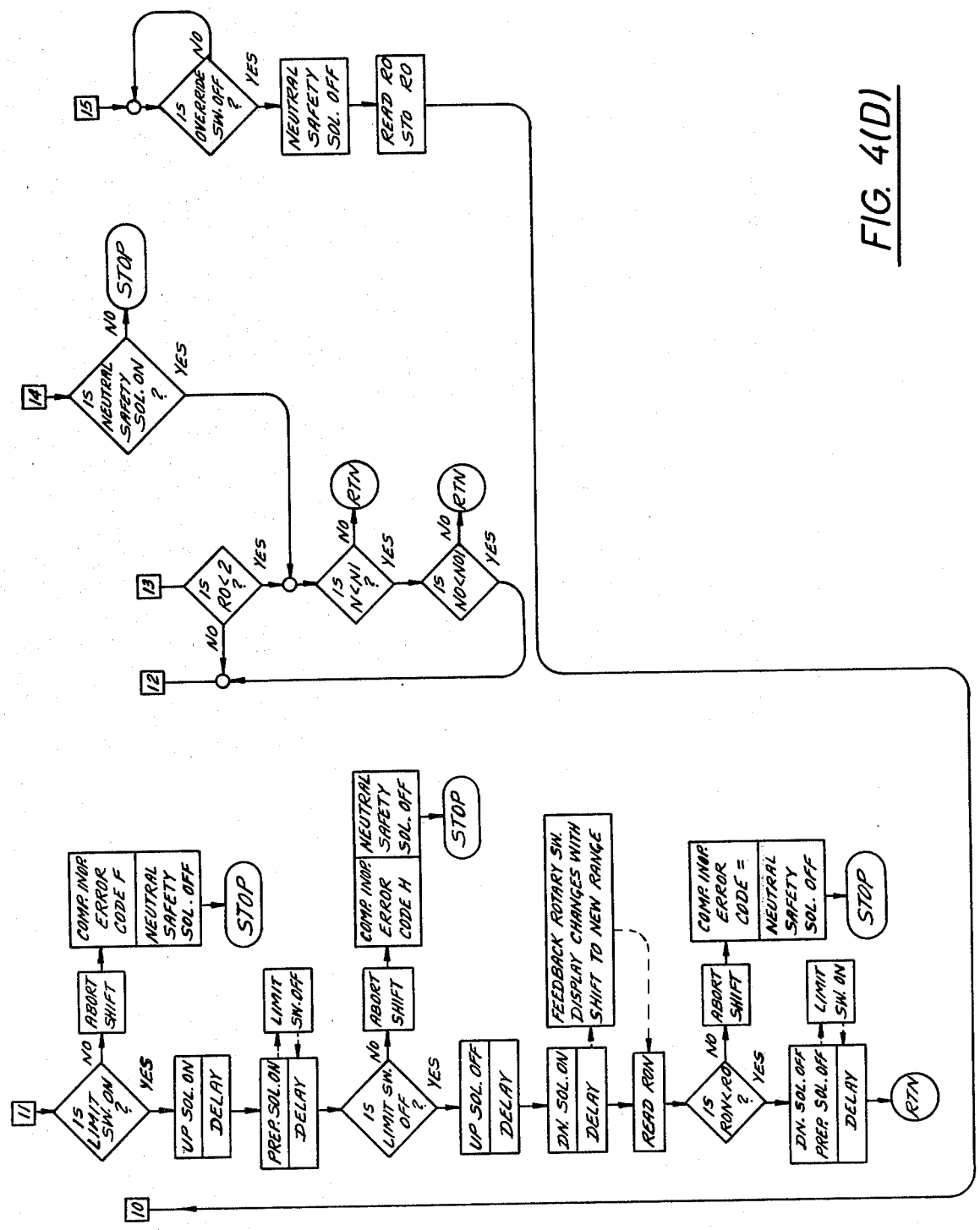

FIGS. 3(A) and 3(B) taken together show an electric circuit diagram of the control system and electronic controller of FIG. 1;

FIGS. 4(A), 4(B), 4(C) and 4(D) taken together show a schematic diagram of the logic functions performed by the electronic controller of FIG. 3.

DESCRIPTION OF A PREFERRED EMBODIMENT

FIG. 1 shows a transmission system and a control system therefor, including an electronic controller EC, in accordance with the invention, which are understood to be mounted in an off-highway vehicle, only portions of which are shown. The transmission system includes a torque converter TC which is connected to be driven by the vehicle engine or prime mover PM. Torque converter TC is connected to drive an input shaft IS of a power transmission T which has an output shaft OS which is connected to drive the vehicle wheels W. Torque converter TC includes a conventional solenoid-operated lockup clutch LC. Transmission T includes a conventional solenoid-operated retarder clutch RC. The vehicle is provided with a load-carrying dump body B which is pivotably movable in a conventional manner by an extendable/retractable hydraulic cylinder HS which is operated by a dump body control valve DV. The vehicle engine PM is understood to include a throttle TH which is operated to effect changes in engine speed by means of an accelerator pedal AP which is understood to be mounted on the floor F in the vehicle operator's cab (not shown).

Power transmission T is, for example, a hydraulically-operated multi-speed shiftable transmission capable of forward, neutral and reverse operations, and having a plurality of forward speed ranges. Transmission T is understood to include a plurality of conventional hydraulically-operated friction plate type shifting clutches (not shown) which operate in combination with a plurality of various gears (not shown) to provide, for example, nine forward speed ranges, a neutral (or starting) range, and one reverse speed range. Such a clutch arrangement and mode of operation is disclosed in detail in U.S. Ser. No. 73,508.

The shifting clutches (not shown) in transmission T are operated by the transmission control system shown in FIGS. 1, 2 and 3(A) and 3(B). The system includes a rotary range selector valve RSV which is operated by three solenoid valves designated as a pre-positioning solenoid valve PPS; an upshift solenoid valve US; and a downshift solenoid valve DS. These solenoid valves, as well as a lockup solenoid valve LUS for lockup clutch LC of torque converter TC, and the solenoid valves NSVS, ROS and RIS for transmission T are connected to and operate in response to electrical signals received from electronic controller EC.

The controller EC receives electrical input signals to effect properly timed operation and sequencing of the aforementioned solenoid valves from several sources, including, for example, an operator's shift range selector switch CL; a limit switch LS and a rotary switch 59 which are located in transmission T and connected to rotary valve RSV, as hereinafter explained; a first magnetic type speed sensing device SS connected to respond to the speed of the transmission power output shaft OS and a second magnetic type speed sensing device ISS connected to respond to the speed of the transmission power input shaft IS. The controller EC also receives other electrical input signals from other switches connected thereto, as hereafter explained. The shift selector switch CL includes a manually operable shift lever SL which is movable from neutral position N to reverse position R or to any one of nine forward positions F1 through F9, as FIG. 1 shows. Such positioning of shift lever SL provides appropriate electrical input signals indicative of shift lever position to controller EC and the latter provides appropriate output signals to operate the transmission clutches.

Figure 2:
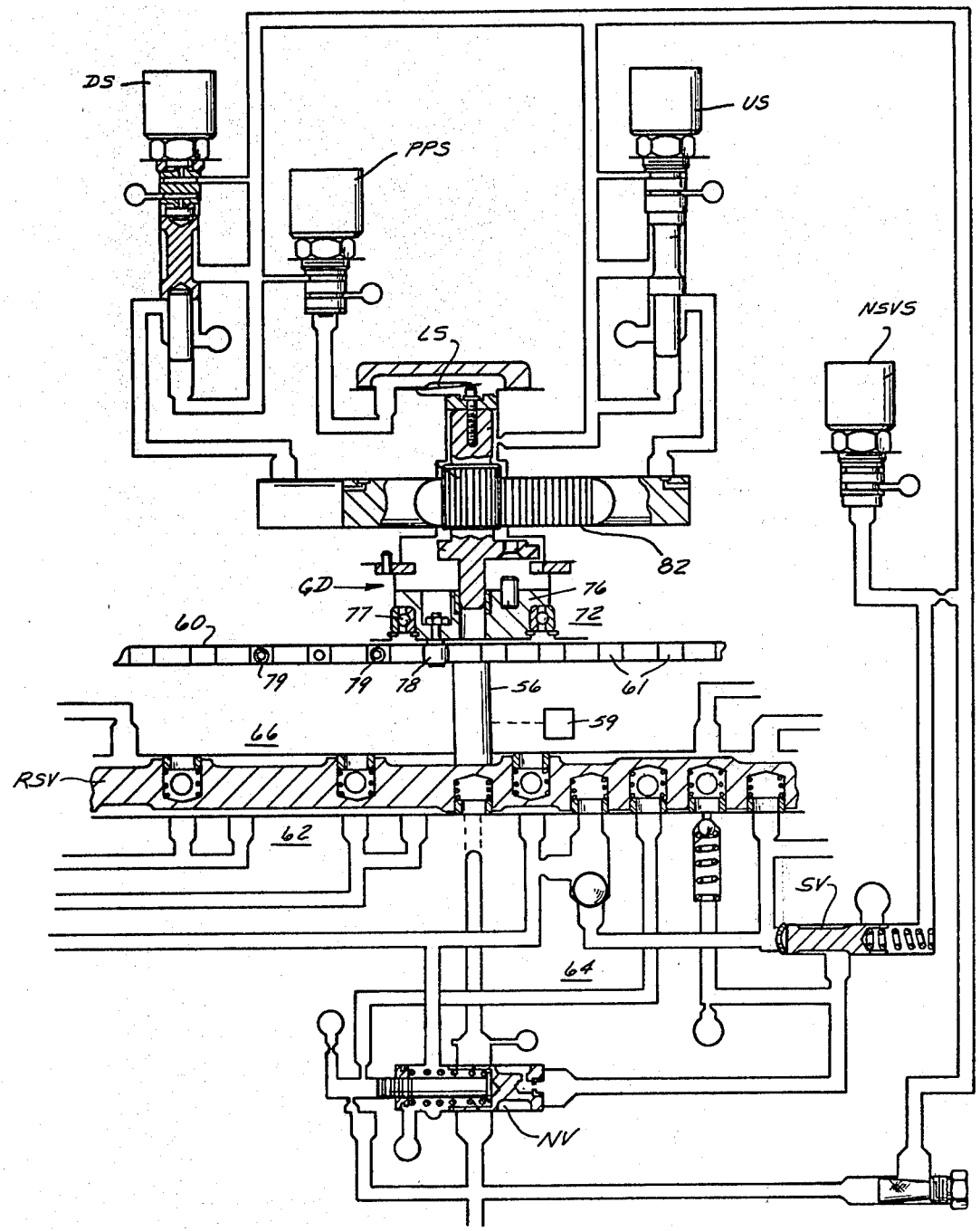
FIG. 2 is an enlarged schematic diagram of part of the hydraulic circuit of the control system of FIG. 1, showing the rotary range selector valve and certain solenoid valves associated therewith.

As FIGS. 1 and 2 make clear, the range selector valve RSV and the three solenoid valves therefor are mounted in a housing H1 which is secured to main transmission housing H. Interconnecting fluid passages therebetween, shown in FIG. 2, serve as a means by which pressurized hydraulic fluid is communicated between the control system and the various hydraulically actuated clutches (not shown) of transmission T.

As FIG. 2 best shows, a shaft 56 is rotatably journalled within the housing H1 and the rotating range selector valve RSV is secured thereon for rotation therewith. A geneva wheel 60 having a series of circumferentially spaced and radially extending open slots 61 is secured to valve RSV for rotation therewith. An electrical rotary switch 59 is connected to the end of shaft 56 and provides feedback to controller EC and indicates the speed range which the valve RSV is in, as will appear.

The range selector valve RSV is in fluid communication with various passages shown in FIG. 2 located in a fixed base plate 62 and in a fixed ditch plate 64. Shiftably mounted in the ditch plate 64 is a neutral safety valve NV operated by the neutral safety solenoid valve NSVS and a shuttle valve SV (FIG. 2).

The rotary selector valve RSV is mounted in the valve body 66, as shown in FIG. 2. It will be appreciated that base plate 62, ditch plate 64, and valve body 66 are all secured together to generally form the housing H1.

A geneva drive member 76 is journalled on anti-friction bearing 77 mounted in body 72 and cam follower 78 is fixed on drive member 76 and extend therefrom to be engageable in slots 61 of the geneva wheel 60. The geneva wheel 60, cam follower 78 and drive member 76 in general constitute a geneva drive GD. Spacers 79 may be secured in certain of the slots 61 to mechanically block these slots of the wheel to thereby prevent the selector valve RSV from being shifted to a speed range higher than is permitted in a specific use or from being shifted below the reverse speed range.

In the arrangement of FIG. 1, the sensing means take the form of a two magnetic pick-ups, one (ISS) for the torque converter output speed and another (SS) for the transmission output speed, and an eleven position-responsive rotary switch 59 and a limit switch LS both connected to the rotary range selector valve RSV. In addition, the rotary selector valve RSV is provided with a pre-positioning solenoid valve PPS. The torque converter TC is provided with a lockup solenoid valve LUS. The transmission T is provided with a neutral safety solenoid valve NSVS, a retarder clutch interrupt solenoid valve RIS and a retarder clutch overspeed solenoid valve ROS. All solenoid valves are operated in an appropriate manner and sequence by output signals from the electronic controller EC in response signal information provided to the electronic controller EC by the manually operable shift selector switch CL which has a control lever SL, by the speed sensing means hereinbefore described and by auxilliary switches required by the system. Such auxilliary switches include, for example, a throttle position switch APS actuated by the vehicle accelerator pedal AP, a retarder clutch pressure switch RPS, a neutral start switch NS, a lockup pressure switch LUPS, a cargo body position switch CBS, a cargo hoist valve air-pressure switch HVPS, a manually operable dump override switch DOS, all of which switches and others are hereinafter described in detail. Furthermore, the electronic controller EC provides information which is displayed on a display device DD the operator's dashboard, including such information on vehicle speed, transmission range selected by the operator, condition of the torque converter lockup clutch LC and the retarder clutches RC, operational state of the electronic controller EC and other relevant information, such as identification and location of specific system failures, if any.

GENERAL OPERATION

The range selector valve RSV is a transmission-mounted 11-position mechanical-hydraulic valve assembly actuated by the three electric solenoid valves US, DS, PPS. The transmission T can be shifted up or down one gear at a time through nine forward gear ranges, neutral and one reverse. The valve RSV prevents multiple clutch engagements inadvertently and keeps the transmission in gear regardless of loss of electrical power to the system. The correct sequence of signals from electronic controller EC to the various solenoid valves and other check points in the electronic circuitry completes a single up or down shift. The top gear that can possibly be achieved can be limited by internal adjustment within electronic controller EC or by operator placement of lever SL of the electric range selector switch CL in maximum position. For example, placement of range selector lever, SL in 6th gear range allows the transmission T to operate automatically from ranges 1 through 6. Vehicle reversals, as well as shifts to neutral, are inhibited above a pre-set transmission output speed, as sensed by pickup SS. Operator shifts from neutral to forward or reverse are controlled by the torque converter turbine speed, as sensed by pickup ISS. These shifts are not allowed above a pre-set speed, so as to prevent excessive driveline torques.

During upshifts and downshifts, lockup clutch LC and retarder clutch RC are both disengaged, but the lockup clutch LC will re-engage after a 1.5 sec. delay, if the torque converter turbine speed is still calling for the lockup clutch. The retarder clutch RC, however, will remain disengaged until the vehicle overspeeds in the new range, or the operator manually actuates the retarder clutch RC by means of foot pedal RP and retarder valve OR. A pressure switch APS located on the accelerator pedal AP is used to signal the electronic controller EC not to allow up shifts. If the operator removes his foot from the pedal AP, all upshifts are stopped; normal downshifts, however, will occur at their scheduled shift points.

The cargo body position switch CBS and hoist valve pressure switch HVPS monitor the cargo body B position. When the body B is raised and either switch is open, the electronic controller EC checks which gear the vehicle is in. If it is in any forward gear, it will not affect the operation. If the vehicle is in reverse, the controller EC will automatically shift the transmission T to neutral, regardless of the electric range selector CL position. Once the body B is raised, reverse gear cannot be engaged until the body B is lowered and the selector switch CL is cycled from reverse to neutral to reverse.

When the cargo body B is raised, operation of dump overrided push button emergency switch DOS, which is dash mounted, allows the transmission T to be shifted to first forward, regardless of torque converter turbine speed, transmission output speed, or electric range selector switch position. Once switch DOS is released, the transmission T shifts to neutral provided the output speed SS is below the inhibit set point.

The lockup clutch LC is operated by electric solenoid valve LUS. A signal from the electronic controller EC causes the lockup clutch LC to engage and disengage at pre-set speeds as sensed by the torque converter turbine speed pickup ISS. The lockup clutch LC is disengaged during any transmission shift, and remains so for approximately 1.5 seconds before re-engaging. Engagement of the lockup clutch LC also occurs during operation in the retarder mode, which is signaled by the retarder clutch pressure switch RPS. A signal light (not shown) on the dash mounted indicator panel DD signals a lockup condition by monitoring the LUPS.

The retarder clutch RC is actuated either manually, by operator control of the cab floor mounted pedal actuated valve OR, or automatically by the electronic controller EC. When speeds in excess of the normal engine high idle speed are achieved, the electronic controller EC engages the retarder clutch RC to full capacity. This mode has an adjustable speed set point based on torque converter turbine speed.

The torque capacity available in the retarder clutch mode is controlled through pressure regulation. The pressure is operator controlled through the cab floor mounted pedal AP. The retarder clutch RC is automatically disengaged when a transmission shift is initiated.

UPSHIFT OPERATION

During a normal up or down shifting operation the system operates as follows.

Speed is defined by the speed pick up or sensing device SS at the transmission output shaft OS. Transmission T is shifted by operation of hydraulic range selector valve RVS which operates so as to route fluid pressure to the appropriate clutches only in the transmission. The valve RSV can be moved up or down only one gear range increment at a time by means of appropriate operation of the three solenoids US, DS, PPS.

To make any one range shift, a particular sequence must be followed. For example, upshift from any gear range to the next higher gear range the following sequence occurs. Limit switch LS is used to check the axial position of the actuator of rotary valve RVS by looking for a fully disengaged position (i.e., contacts closed). If the contacts are closed, shifting can continue. If not closed, electronic controller EC turns on a "computer inoperative" light on dash panel DD and displays an error code indicative of this failure.

Assuming correct operation, controller EC effects operation of that solenoid in the opposite direction to the direction of the shift required (in this case the down solenoid DS, since in the example shift is to be up). Then controller EC effects energization of the pre-position solenoid PPS. After a 0.2 second delay, but before the energization of the up shift solenoid US, the controller EC again checks the position of the limit switch LS, as disclosed above. If LS is off (e.g., contacts open) the sequence continues. If LS is on, controller EC turns on the "computer inoperative" light on panel DD and displays an error code indicative of this failure. Assuming correct operation, controller EC energizes the upshift solenoid US. This allows hydraulic fluid pressure to move the rack 82 and rotate the selector valve RSV one gear range. Full attainment of the new upshift position checked or determined by examination by controller EC of a signal from the eleven position rotary switch 59 which is driven by the stem of valve RSV. If proper movement is achieved, and after a 0.2 second delay, controller EC de-energizes the pre-position solenoid PPS and the upshift solenoid US. The valve RSV is now ready to proceed to the next appropriate gear change when so signalled by the speed signal from controller EC.

If the signal from the rotary switch 59 does not show achievement of the correct gear, as called for by the transmission speed, the controller EC aborts or negates any further operator shifts and causes turn on of the computer inoperative light on panel DD and displays the proper error code.

The transmission T can be shifted up and down through nine forward gear ranges, neutral and one reverse gear range if predetermined upshift and downshift signals related to transmission output speed are present. These speed signals or shift points for upshift are adjustable or presettable for defining each speed range. The downshift points are also adjustable.

Provision can also be made to wire in a maximum number of upshifts to enable use of the controller EC on a transmission with less than nine speeds, for example. The maximum gear range that can also be automatically achieved by controller EC is limited in that it is equal to placement of the range selector CL in any forward range. Controller EC initiates automatic shifts starting in first gear range forward up the higher forward range selected. Shifting takes place automatically upon achievement of transmission output speeds as scheduled for each range and indicated by sensor ISS. The achievement of the highest speed range selected by the operator by means of selector CL limits transmission gear range regardless of higher transmission output speeds. The transmission T is then allowed to automatically downshift to an appropriate gear range determined by actual torque converter turbine speed without any change in position of selector Cl. Downshifting proceeds only down to its first gear range.

The placement of the shift selector CL in neutral when the vehicle is traveling forward at a speed above some predetermined speed results in non-attainment of neutral gear in the transmission T until a sufficiently low speed is achieved and signalled by sensor SS. This speed is adjustable and can be designated as an inhibit speed. The placement of the shift selector SL into reverse subjects the system to the same logic by controller EC as applies to neutral, as explained above. This inhibit speed function is applicable in shifting from forward to reverse or from reverse to forward shifts.

The placement of the shift selector SL into reverse or any forward speed range from neutral position results in a non-attainment of the selected direction and shift unless the following conditions are met: First, transmission output speed must be below the inhibit speed (inhibit speed may, for example, be equal to approximately ¼ of the maximum speed attainable in first speed range forward). Second, torque converter TC turbine speed must be less than a selected speed, such as 1500 RPM.

DOWNSHIFT OPERATION

Operator movement of the shift selector CL at any time to a lower gear allows controller EC to effect a lower gear downshift only when the correct speed is achieved by the torque converter turbine shaft IS, sensed by sensor ISS. This speed is factory chosen on the basis of full throttle engine operation.

During any transmission upshift or downshift, the solenoids LUS and RIS, ROS actuating the lockup clutch LC and the retarder clutch RC must first be actuated so that both of these clutches are disengaged during each transmission shift.

This is accomplished by the controller EC. Switch APS furnishes a simple off-on signal to the electronic control EC. When switch APS is "off" (pedal at idle), the controller EC does not allow upshift above the gear range presently engaged regardless of the position of selector switch CL or transmission output speed. The gear range already engaged will be held by the transmission T. Upon throttle pedal AP actuation to cause switch APS to go to "on" position, the controller EC operates normally and automatically as previously described. Switch APS only effects control of gear ranges one through nine (or whatever maximum range exists) and does not interfere with the reverse or neutral ranges, as previously described. Although the function of switch APS is to prevent any upshifts when actuated, it does not interfere with normal downshifting.

The cargo body B can be raised or lowered with the selector switch CL in any position. If the cargo body B is raised while in selector switch CL is in the forward mode, the transmission T will shift normally. If the cargo body B is raised with the selector switch CL is in reverse, the controller EC automatically shifts the transmission T to neutral as soon as the limit switch CBS is closed. In order to re-attain reverse operation of the vehicle, the following conditions must exist. First, cargo body B must be lowered to the rest position wherein switch CBS opens. Second, the selector switch CL must then be cylced to neutral, then back to reverse (also ISS must be below 1500 rpm, SS must be below inhibit).

The manually operable momentary closed pushbutton override switch DOS mounted on the vehicle dash board allows a shift to first range forward if the cargo body B is up. even through the shift selector CL is still in neutral or reverse. Release (opening) of pushbutton switch DOS causes the transmission T to again shift to neutral (if SS is below inhibit). The override switch DOS causes the controller EC to effect bypass of the turbine-inhibited function for a neutral to forward shift. The shift from neutral to first range forward by use of switch DOS is not to be inhibited by any of the speed inhibitions hereinbefore described.

LOCKUP CLUTCH FUNCTIONS

Lockup clutch LC is engaged and disengaged at prechosen speeds in response to the turbine speed pickup or sensor ISS. The lockup clutch LC is signaled or operated to be engaged and disengaged by lockup clutch solenoid LUS and is to be disengaged every time the transmission T shifts. The lockup clutch LC is not to be disengaged when the retarder clutch RC is actuated, either manually or electrically. If the lockup clutch LC is disengaged, it must be re-engaged.

When transmission T is being actuated manually by selector switch MC, no lockup engagement of clutch RC is allowed. Lockup is not allowed in neutral.

RETARDER FUNCTION

The retarder RT is a constantly oil-filled device operated in the "off" position at a pressure of 10-15 psi (main cavity transmission fluid outlet port pressure), for example. The retarder RT is actuated by engaging a wet immersed hydraulically activated retarder clutch RC. Clutch RC can be actuated manually through movement of the cab floor mounted pedal actuated valve OR which allows the clutch RC to fully engage instantaneously while holding cavity pressure, sensed by retarder pressure switch RPS at "minimum". If the full torque capability of the retarder RT is called for through maximum pedal actuation, then the minimum pressure is advanced to maximum through a timed rate-of-rise in retarder valve OR which is pre-set for a given time interval, for example, 1 second.

The retarder RT can also be engaged automatically by solenoid RIS in any gear range when a speed in excess of that for the normal upshift point is achieved. For example, assuming a normal upshift speed point of 1920 r.p.m., the retarder RT is set to actuate at 110% thereof (i.e., at 1920+192=2112 r.p.m.).

This speed is sensed by sensor ISS on the torque converter TC turbine and is slightly in excess of the full idle runout speed of the engine throttle setting. A retarder overspeed solenoid ROS then energizes to turn retarder RT on. Retarder clutch RC is disengaged by energization of the retarder interrupt solenoid RIS.

The retarder clutch RC will be automatically disengaged every time a transmission shift is called for by controller EC. The retarder RT can be re-engaged after a predetermined or set time (for example, 600 milliseconds) after the shift is completed, if the floor pedal RP is still operator depressed. If the retarder RT had been engaged from an overspeed condition, it may be re-engaged in this now-achieved gear range either through another overspeed condition or through manual actuation.

The above description of functions of the automatic retarder RT covers actuation to full capacity when overspeeds are achieved and the operator has not manually engaged the retarder RT. If the operator has manually engaged the retarder RT and has so chosen the capacity (i.e., moderate) that the vehicle can reach the excess speeds as previously described, the controller EC turns on retarder overspeed solenoid ROS which engages the retarder RT to full capacity.

FAILURE MODES OF THE SYSTEM

In case of full loss of electrical power, transmission T stays in the gear range then engaged as indicated by an LED power indicating light on controller. In case of momentary loss of electrical power for 100 milliseconds or less, for example, controller EC does not loose any logic information.

In case of failure of throttle switch APS, transmission T does not upshift even with the throttle pedal AP depressed.

Switch APS is wired so that when an engine idle condition is achieved, the switch APS is open and no upshift is allowed. If switch APS is inoperative, no upshift is allowed when throttle pedal AP is depressed.

In case of failure of cargo body switch CBS and hoist valve pressure switch HVPS, which signal the controller EC when the dump body B is raised to thereby prevent shifting, these switches are closed with the dump body B down. These switches cause controller EC to shift transmission T to neutral if range selector switch CL is inadvertently left in reverse as dump body B is raised. These switches have a 600 millisecond delay in operation so that inadvertent short term actuation due to bounce does not stop function of controller EC.

In case of failure of retarder pressure switch RPS, which turns on a light in display DD and signals the lockup clutch LC in some shifting modes, and which is normally closed, the controller EC checks retarder pressure switch condition prior to any shift. If the retarder RT has not been disengaged, selected shift will be aborted. If switch RPS fails, no shift is allowed and a light on panel DD comes on.

In case of failure of retarder disengage solenoid RIS, this failure is detected by the retarder clutch pressure switch RPS and controller EC turns on the "computer inoperative" light and a proper error code is also displayed. Upon every shift, the retarder disengage solenoid RIS should manually drop the retarder fluid pressure at retarder clutch RC to zero and the light goes on if pressure does not drop.

A lockup pressure switch monitors the lockup clutch. When the lockup clutch is signaled by the computer, the pressure switch monitors whether or not the clutch pressure responds. During every shift, the lockup clutch solenoid should de-energize and drop out the lockup clutch for 1.5 seconds. If the pressure does not drop to zero during this time, (contacts closed) the computer inoperative light will turn on. An appropriate error code will also be displayed.

In case of failure of the speed pickup sensors ISS and SS, the controller EC monitors both pickups for either short or open circuit. A failure in either one of these pickups turns on the computer inoperative light on panel DD. The transmission T will remain in whatever gear the failure occurred, and the dash gear range indicator light on panel DD will continue to indicate the gear range also error code. If the engine and ignition switch are turned off and then restarted, the transmission T will be in neutral. The controller EC operates so that the vehicle can then only be operated in first forward, neutral or reverse until the faulty pickup is repaired. During this time, there will not be any shift inhibiting, automatic retarder operation, or lockup clutch operation. The retarder RT, however, can still be operated manually. The lack of a turbine speed signal indicated non-attainment of lockup in any gear range and also prevents automatic engagement of retarder RT on overspeed. Also, shifts below certain engine speeds are no longer inhibited from neutral to a selected direction. Error codes on dash indicator DD denote speed sensor failures. If this failure occurs while in gear, the controller EC will not downshift until the selector switch CL is moved to neutral and the input power is cycled off-on. From then on, the vehicle can operate only in first forward, neutral or reverse.

The potential failure modes of the various devices, as discussed above, that are sequenced in a normal shift are shown in FIGS. 4(A)-4(D). The failure modes capable of detection by controller EC takes into account the potential failure of an electrical device caused by either a failure (open circuit) showing a lack of signal, or a failure (short circuit) showing a continuously ON function. These two electrical failure modes are combined with signals indicative of two mechanical situations, namely, no mechanical problem, and a mechanical malfunction (valve stuck in bore, etc.).

When an indication of "computer inoperative" occurs on the dash digital display DD, this signals that controller EC has operated to stop all automatic operational functions, including shifting, and holds the vehicle in the range wherein failure occurred. Vehicle shifting must be manually operated. This is accomplished, for example, by detaching a cable (not shown) from the electric range selector switch CL and re-attaching it to a manual selector control device which takes the form of a simple dual pushbutton switch MC (see FIG. 1) mounted in a small enclosure (not shown). Depressing the forward switch on MC will shift the transmission T up one gear range at a time. Depressing the downbutton will shift the transmission T down one gear range at a time. It is the purpose of this device MC to give the operator the ability to move the vehicle back to a shop area for diagnosis and repair. The vehicle is not intended to be used in its normal work cycle by means the "manual operator" device MC. Acuation of the lockup clutch LC will not occur in this mode.

FIGS. 3(A) and 3(B) show an electric circuit diagram of the electronic controller EC shown in FIG. 1, and also show the herein-before-mentioned electrical inputs thereto and outputs therefrom. The input and output devices in FIGS. 3(A) and 3(B) bear the same identification numbers as used in FIG. 1. The circuitry of controller EC shown in FIGS. 3(A) and 3(B) is seen to comprise various integrated circuit devices and other solid state devices which are identified by means of their type or model designation number. Since those skilled in this art know or are able to ascertain by referring to the specification sheets available for these devices, the nature and mode of operation, it is believed that further detailed explanation is unnecessary in this specification.

FIGS. 4(A)-4(D) show a schematic diagram or flow-chart depicting the output logic functions performed by electronic controller EC in response to inputs received from the several input devices.

The following table lists the nomenclature and abbreviations used in FIGS. 4(A)-4(D):
N=Turbine Speed
ND=Turbine Speed at Downshift Point
NI=Turbine Speed that Inhibits Shifts Into and Out of Neutral
NO=Output Shaft Speed
NLI=Turbine Speed at which Lockup Clutch Engages
NLO=Turbine Speed at which Lockup Clutch Releases
NOI=Output Shaft Speed that Inhibits Shifts Into and Out of Neutral
NRI=Turbine Speed at which Retarder Automatically Engages
NU=Turbine Speed at Upshift Point
RO=Operating Range Shown on Display
RON=New Operating Range
RS=Selected Range
RTN=Return to and Continue
Abbreviations:
Comp. Inop.=Computer Inoperative
DN.=Down
MAN.=Manual
PREP.=Prepositioning
PRES.=Pressure
RET.=Retarder
SOL.=Solenoid
STO.=Store
SW.=Switch
THROT.=Throttle

I claim:

1. In a control system for a power transmission including a power input shaft and a power output shaft and having a plurality of speed change gears, a plurality of selectively operable fluid-actuated clutches for operating said speed change gears to provide different transmission output speed ranges, a selectively movable range selector valve for distributing pressurized fluid to operate different clutches, and a lock-up clutch which is disengageable during shifting;

first solenoid means for operating said lock-up clutch;
means for sensing the rotational speeds of said power input and power output shafts and for providing electric speed signals indicative of the speeds of said shafts;
second solenoid means for moving said movable range selector valve;
selectively operable range selector switch means for providing an electric signal indicative of a selected shift range;
position responsive switch means for providing an electric signal indicative of the position of said range selector valve, said position responsive switch means including first switch means for providing a signal indicative that said range selector valve is in readiness regardless for movement and second switch means for providing a signal indicative of the range selector valve position;
and an electronic controller for receiving said signals and for providing output signals to operate said second solenoid means to effect movement of said range selector valve to effect shifting of said transmission selected to a speed range, provided said range selector valve is in a predetermined position, and provided said means for sensing the rotational speeds of said shaft indicates that there is rotation at predetermined speeds, and to operate said first solenoid means to disengage said lock-up clutch during shifting.

2. A control system according to claim 1 wherein said second solenoid means includes an up-shift solenoid, a down-shift solenoid, and a pre-position solenoid, and wherein said electronic controller effects operation of one of said up-shift or down-shift solenoids to effect a change in speed range subsequent to operation of said pre-position solenoid and subsequent to receipt of a signal from said position responsive switch means indicative that said range selector valve is in said predetermined position.

3. A control system according to claims 1 or 2 wherein said transmission is provided with a retarder clutch disengageable to permit shifting, wherein third solenoid means are provided for operating said retarder clutch, and wherein said electronic controller operates said third solenoid means to disengage said retarder clutch during shifting.

4. In a control system for a multispeed shiftable power transmission having a plurality of fluid-actuated clutches selectively operable to provide different transmission output speed ranges, and a range selector valve movable to a plurality of positions for distributing pressurized fluid to operate said clutches;

valve positioning means operable to move said range selector valve to said positions;

range selector means operable to provide signals indicative of a selected speed range;

position responsive means operable to provide signals indicative of the position of said range selector valve, said position responsive means including first means for providing a signal indicative that said range selector valve is in readiness for movement and second means for providing a signal indicative of the range selector valve position;

and a controller for receiving said signals and for providing a control signal to operate said valve positioning means to effect movement of said range selector valve to operate said clutches andd effect shifting of said transmission to said selected speed range, provided said range selector valve is already in a predetermined position.

5. A control system according to claim 1 wherein said valve positioning means includes up-shift means, down-shift means and pre-position means, and wherein said controller effects operation of one of said up-shift or down-shift means to effect a change in speed range subsequent to operation of said pre-position means and subsequent to receipt of a signal from said position responsive means indicative that said range selector valve is in said predetermined position.

6. A control system according to claim 1 or 5 further including means for sensing the rotational speed of said transmission and for providing a signal indicative of such speed to said controller, and wherein said controller provides said control signal to operate said valve positioning means when said such speed is at a predetermined speed.

7. A control system according to claim 1 or 5 wherein said range selector valve is a rotary valve.

8. In a control system for a power transmission having power input and power output shafts, a plurality of speed change gears, a plurality of selectively operable fluid-actuated clutches for operating said speed change gears to provide different transmission output speed ranges, and a selectively movable range selector valve for distributing pressurized fluid to operate different clutches;

valve positioning means operable for moving said movable range selector valve;

selectively operable range selector switch means for providing an electric signal indicative of a selected shift range;

position responsive switch means for providing electric signals indicative of the position of said range selector valve, said position responsive switch means including first switch means for providing a signal indicative that said range selector valve is in readiness for movement and second switch means for providing a signal indicative of the range selector valve position;

and an electronic controller for receiving said signals and for providing output signals to operate said valve positioning means to effect movement of said range selector valve to effect shifting of said transmission to a selected speed range, provided said range selector valve is in a predetermined position.

9. A control system according to claim 8 wherein said range selector valve is a rotary valve and wherein said position responsive switch means includes a rotary switch.

10. A control system according to claim 8 wherein said valve positioning means includes an up-shift solenoid, a down-shift solenoid and a pre-position solenoid, and wherein said electronic controller effects operation of one of said up-shift or down-shift solenoids to effect a change in speed range subsequent to operation of said pre-position solenoid and subsequent to receipt of a signal from said position responsive switch means indicative that said range selector valve is in said predetermined position.

11. A control system according to claim 10 wherein said range selector valve is a rotary valve and wherein said position responsive switch means includes a rotary switch.

12. A control system according to claim 8 wherein said second switch is a rotary switch.

13. A control system according to claim 8 further including means for sensing the rotational speed of at least one of said transmission shafts and for providing an electric signal indicative of such speed to said electronic controller, and wherein said electronic controller provides said ouput signal to operate said solenoid means when said such speed is at a predetermined speed.

* * * * *